United States Patent Office 3,332,264
Patented July 25, 1967

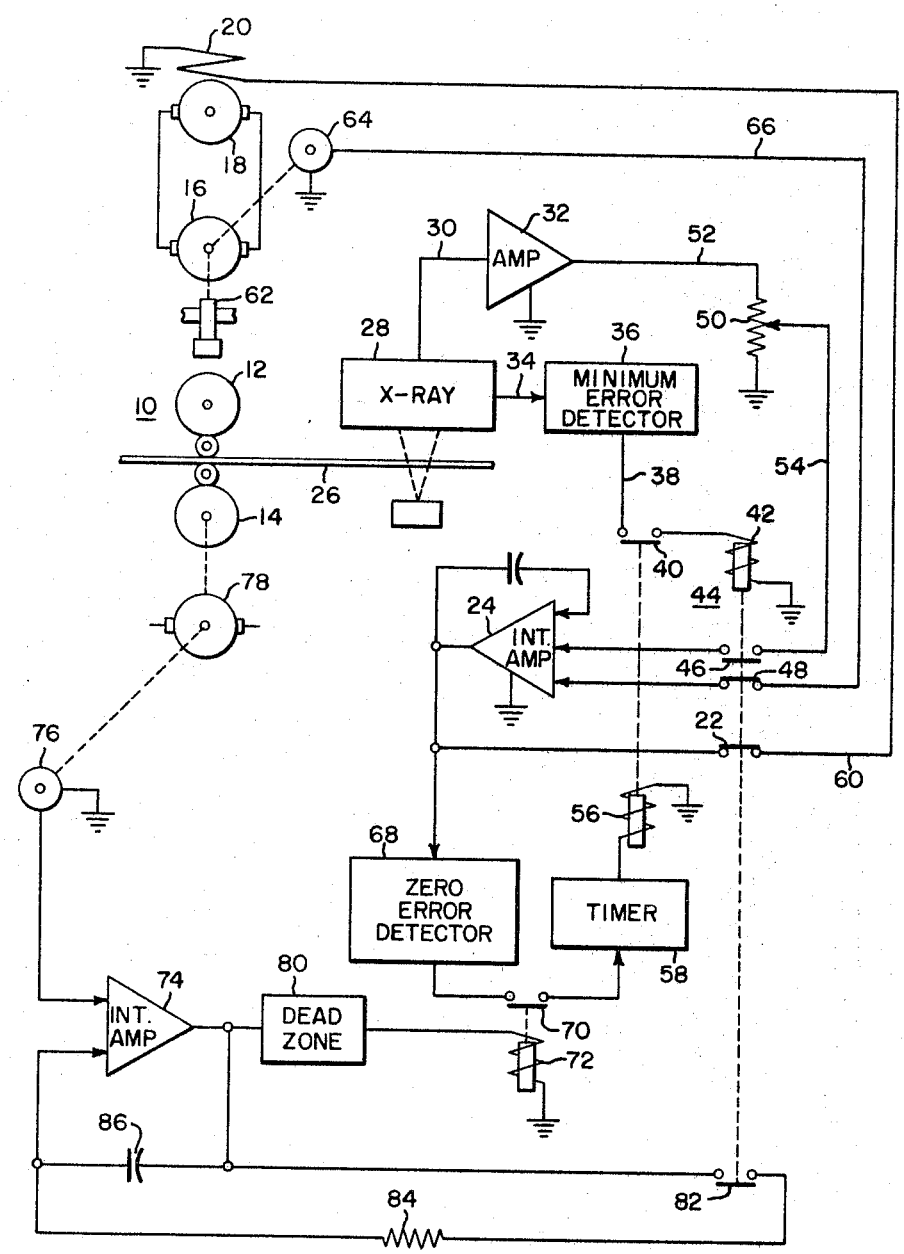

3,332,264
STRIP THICKNESS CONTROL APPARATUS
Robert P. Bonn, Clarence, N.Y., assignor to Westinghouse Electric Corporation, Pittsburgh, Pa., a corporation of Pennsylvania
Filed Oct. 29, 1964, Ser. No. 407,315
6 Claims. (Cl. 72—16)

The present invention relates in general to workpiece thickness control apparatus operative with a rolling mill, and more particularly to automatic strip workpiece thickness control apparatus for determining the adjustment of workpiece strip thickness controlling screwdown devices operative with that rolling mill.

It has been known in the prior art to utilize a variable voltage workpiece thickness control apparatus, or automatic strip gauge control apparatus, including a control apparatus operative to adjust the screwdown motor and the screwdown setting for a predetermined time interval dependent upon the operating speed of the screwdown motor which in turn is dependent upon the magnitude of the thickness error. This prior art control apparatus was considered for many applications to be too slow in operation and subject to signal drift conditions.

Accordingly, it is an object of the present invention to provide an improved and faster operating and more sensitive thickness error correction control apparatus for use with a workpiece strip rolling mill.

It is a different object of the present invention to provide an improved screwdown position sensing and regulating apparatus wherein a first characteristic of the screwdown motor adjusting mechanism which is easier to sense is utilized for determining the control for a second and needed characteristic of the screwdown adjusting mechanism which is more difficult to sense.

These and other objects and advantages of the present invention will become apparent in view of the following description taken in conjunction with the drawing wherein there is provided a diagrammatic showing of one form of the present control apparatus.

In accordance with the teachings of the present invention, a strip thickness control apparatus is provided which functions as an error sampling system. A measured thickness error signal, if greater than 1% of the desired strip thickness, is clamped by applying the error signal to one input of an integrating amplifier for a first time interval. Then the resulting output signal of the integrating amplifier energizes the variable voltage regulator operative with the screwdown mechanism adjusting motor. The running of the screwdown motor is coupled through a tachometer to provide a feedback signal to another input of the same integrating amplifier to cause its output signal to become zero. Since the integral of the screwdown motor speed is proportional to the total revolutions of the screwdown motor, the total revolutions of the screwdown motor and thereby the amount of screwdown setting adjustment required to reduce the clamped thickness error signal to zero will be proportional to the magnitude of the clamped thickness error signal. Thusly, there has been provided a strip thickness control system including a screwdown motor tachometer supplying a feedback signal to an integrating amplifier which is connected to energize the screwdown motor through its variable voltage regulator to vary the screwdown motor voltage and hence motor speed, to in effect comprise a screwdown motor position regulating system.

In the drawing there is shown a rolling mill 10 including an upper roll 12 and a lower roll 14. A screwdown motor 16 is operative with a supply generator 18, which generator has a field winding 20 energized through a relay contact 22 by the output signal from an integrating amplifier 24.

The workpiece strip 26 passing through the rolling mill 10 has its thickness measured by an X-ray gauge 28, which is a conventional and well known X-ray gauge and provides a thickness error or deviation signal through a conductor 30 to an amplifier 32. The X-ray gauge also provides a percent thickness error signal through a conductor 34 to a minimum error circuit 36 which can comprise a conventional signal deadband circuit. If the percent thickness error or deviation signal is greater than a predetermined value such as 1% of the desired strip thickness, the minimum error circuit 36 provides an output signal through conductor 38 and contact 40 when closed to energize a control winding 42 of a relay 44. When the control winding 42 is so energized, the normally open contact 46 is closed and the normally closed contacts 48 and 22 are at this time opened.

The thickness error signal supplied by the X-ray gauge 28 through the conductor 30 and the amplifier 32 is passed through a well known strip hardness adjusting potentiometer 50, such that when a one mil thickness error would for example provide a particular voltage thickness error signal to the conductor 30 to the amplifier 32, the output signal from the amplifier 32 and supplied to the conductor 52 may be in the order of ten times that voltage. Through adjustment of the hardness potentiometer 50, the resulting signal supplied through conductor 54 may be in the order of 0.9 times the amplified voltage to cause a correction in the spacing between the roll members 12 and 14 of 5 mils, which due to the spring characteristic of the rolling mill 10 would provide an actual correction in the strip thickness of 1 mil.

When the control winding 42 of relay 44 is energized, the contact 46 is closed such that the thickness error signal now provided through conductor 54 is applied to one input of the integrating amplifier 24. The contact 40 of relay 56 is closed for a time interval determined by the timer 58, and when the relay 56 is thereafter deenergized to open the contact 40, the contact 48 closes as does the contact 22. The latter contact 22 applies the output signal from the integrating amplifier 24 through the conductor 60 to energize the field winding 20 of generator 18 to thereby vary the voltage applied to the screwdown motor 16. This causes adjustment of the screwdown mechanism 62 as well known to persons skilled in this art, and the operation of the screwdown motor 16 is sensed through a coupled tachometer 64 to provide a feedback control signal through conductor 66 and the now closed contact 48 to another input of the integrating amplifier 24. The feedback control signal supplied by the tachometer 64 brings the output signal to the integrating amplifier 24 to a zero value. This zero output signal condition is sensed by a conventional zero error detector 68 to provide a control signal through a contact 70 of relay 72, when the latter contact 70 is closed, and thus controls the timer 58 for providing another timed period or interval during which the relay 56 is energized to close the contact 40.

The energization of the relay 72 is determined by a transport time delay controlling integrating amplifier 74 that is supplied a signal in accordance with the operating speed of a rolling mill 10 as sensed by a tachometer 76 coupled to the mill drive motor 78. The output signal provided by the intergrating amplifier 74 and connected to the relay 72 thereby increases in value in accordance with the operating speed of the rolling mill 10. A dead zone signal sensing device 80 prevents the energization of the relay 72 until the output signal from the intergrating amplifier 74 reaches a predetermined minimum value, and the time required to reach this predetermined minimum value is a function of the operating speed of the mill drive motor 78. Upon energization of the relay 72 in this manner the contact 70 is closed, the timer 58 starts to operate if the zero error detector 68 provides an output signal through closed contact 70 and closes the contact 40 which energizes the relay 44 to close the normally opened contact 82 to thereby connect a resistor 84 in parallel with the integrating capacitor 86 of the integrating amplifier 74 for the purpose of discharging any charge on the capacitor 86 to bring the output signal of the integrating amplifier 74 to a zero value. After the control time period provided in this manner by the timer 58, the contact 40 is open to deenergize the relay 44 and open the contact 82 to allow another charging or integrating cycle for the transport time delay controlling integrating amplifier 74.

In the operation of the control apparatus shown in the drawing, the variable voltage generator 18 operative with the screwdown motor 16 is controlled in accordance with the measured thickness error or deviation provided by the X-ray gauge 28. The X-ray gauge 28 provides an error signal through the conductor 30, which is proportional to the measured thickness error or deviation, and this error signal is amplified and then applied to the attenuation potentiometer 50 which varies the resulting control signal as a function of the manual setting of the hardness potentiometer 50 as determined by an operator in accordance with the material of the strip 26 passing through the rolling mill 10. The timer 58, when the zero error detector 68 senses a zero output signal from the integrating amplifier in conjunction with an output signal from the dead zone circuit 80 to energize the relay 72, energizes the relay 56 to close contact 40; upon the occurrence of a minimum percent thickness error signal, the relay winding 42 closes contact 46. The thickness error signal from amplifier 32 and potentiometer 50 is supplied through the conductor 54, through contact 46 now closed, to one input of the integrating amplifier 24 such that a resulting output signal is generated by the integrating amplifier 24 in accordance with and proportional to the thickness error sensed by the X-ray gauge 28. A thickness correction should now be made by the screwdown motor 16, as determined by the transport time delay controlling integrating amplifier 74 and the cooperative zero error detector 68 operative to energize relay 72 and the time interval termination by the correction time providing timer device 58, the relay 44 is deenergized to open the contact 46 and to close the contact 22 for applying the output signal from the integrating amplifier 24 through the conductor 60 to the field winding 20 of generator 18 for the purpose of adjusting the screwdown mechanism 62 through operation of the screwdown motor 16. The operating speed of the screwdown motor 16 in this respect is in accordance with the magnitude of the output signal from the integrating amplifier 24. As the screwdown motor 16 operates, the tachometer 64 provides a feedback voltage through the now closed contact 48 to another input of the integrating amplifier 24, which tachometer output voltage is integrated by the integrating amplifier 24, such that the output signal of the integrating amplifier 24 changes in proportion to the travel of the screwdown adjusting mechanism 62. When the desired screwdown mechanism adjustment and thereby strip thickness correction has been realized, the output signal of the integrating amplifier 24 will be zero and the screwdown motor 16 will stop its operation.

The integrating amplifier 74, the zero error detector 68 and the timer device 58 are provided to assure the proper sequencing of the position regulator control apparatus.

The additional thickness error signal obtained from the X-ray gauge 28 through the conductor 34 and calibrated in terms of percentage of thickness error is well known to persons skilled in this art. The latter percentage thickness error signal is applied to a minimum error sensing circuit 36 such that only when the actual thickness error is greater than a predetermined percentage of the desired strip thickness, for example greater than 1% of the desired strip thickness, an output signal will be supplied through the conductor 38 and the contact 40, when closed by timer 58, to energize the control winding 42 of the relay 44.

A contact from the minimum error detector 36 can be connected to a minimum error timer to provide a time delay so that the error signal must be present for a given time before a strip thickness correction will be made. The latter time delay operation can be provided to prevent screw movements for errors of short duration, with a contact from the minimum error timer being connected in the relay circuit to permit a correction to occur.

The zero error detector 68 is connected to sense the output of the integrating amplifier 24 and is biased to drop out at a substantially zero output voltage. The resulting output signal from the zero error detector 68 indicates that the desired thickness correction has been made and initiates the desired time sequence delay. Once a strip thickness correction has been made another correction cannot be initiated until the transport delay circuit including the integrating amplifier 74 has timed out, which timing operation is used to prevent making another correction until the portion of the strip 26 wherein a correction has been made has travelled the distance from the roll bite between the roll members 12 and 14 to the position of the X-ray gauge 28. This desired delay is accomplished by applying the voltage signal from the tachometer 76 coupled to the mill drive motor 78 to the input of the integrating amplifier 74. The output signal of the amplifier 74 is connected through a minimum signal dead zone device 80 which in turn provides an output signal only when the output signal from the integrating amplifier 74 rises to a value in the order of 5 volts. The time interval required by the output signal of the integrating amplifier 24 to rise from a zero voltage to 5 volts is inversionally proportional to the applied voltage from the tachometer 76, therefore the faster the mill drive motor 78 is running the shorter the rise time for this amplifier voltage will be.

Although the present invention has been described with a certain degree of particularity it should be understood that the present disclosure has been made only by way of example and that numerous changes in the details of construction and the combination and arrangement of circuit elements may be resorted to without departing from the scope and the spirit of the present invention.

I claim as my invention:

1. In a strip thickness control apparatus operative with a rolling mill having a strip thickness controlling motor, strip thickness sensing means operative with a strip passing through said rolling mill for providing a first control signal in accordance with the thickness error of such strip, minimum signal sensing means, signal integrating means cooperative with said minimum signal sensing means for providing an output signal to energize said motor, motor operation sensing means for supplying a second control signal in accordance with the operation of said motor, and time control means responsive to the operational speed of said rolling mill for applying for a first time period the first control signal to said signal integrating means when the first control signal has reached a predetermined minimum value and for applying for a second time period the second control signal to the signal integrating means, and output signal sensing means operative with the time control means when said thickness error reaches a zero value to control at least one of the first and second time periods.

2. In strip thickness control apparatus operative with a rolling mill having a strip thickness controlling mechanism, strip thickness measuring means operative with a strip leaving said rolling mill for providing a first control signal in accordance with any thickness error of such strip, signal integrating means providing an output signal to energize said mechanism, thickness control operation sensing means for supplying a second control signal in accordance with the operation of said mechanism, time control means responsive to the operational speed of the rolling mill for applying for a first time period the first control signal to said signal integrating means when the first control signal has reached a predetermined minimum value and for applying for a second time period the second control signal to the signal integrating means, and output signal sensing means operative with the time control means when said output signal reaches substantially a zero value to determine the start of the first time period.

3. In strip thickness control apparatus operative with a rolling mill having a strip thickness controlling motor, strip thickness sensing means operative with a strip passing through said rolling mill for providing an error signal in accordance with the thickness error of such strip, signal integrating means responsive to said error signal for providing an output signal to energize said motor in accordance with the time integral of said error signal, motor operation sensing means for supplying a feedback signal in accordance with the operation of said motor, and time control means responsive to the operational speed of said rolling mill for applying for a first time period the error signal having a first polarity to said signal integrating means and for subsequently applying for a second time period the feedback signal having a second polarity to the signal integrating means, and signal sensing means responsive to said output signal and operative with the time control means when said thickness error reaches a zero value to determine the start of at least the first time period.

4. In a strip thickness correction apparatus operative with a rolling mill having a strip thickness controlling member, strip thickness sensing means operative with a strip passing through said rolling mill for providing a first control signal in accordance with the thickness error of such strip, signal sensing means for providing an output signal to energize said member, member operation sensing means for supplying a second control signal in accordance with the operation of said member, and time control means responsive to the operational speed of said rolling mill for applying for a first time period the fiirst control signal in a first direction to said signal sensing means and for applying for a second time period the second control signal in a second direction to the signal sensing means, and signal control means operative with the time control means when said thickness error reaches a zero value to control at least one of the first and second time periods.

5. In a strip thickness control apparatus operative with a rolling mill having a strip thickness controlling mechanism, strip thickness measuring means operative with a strip leaving said rolling mill for providing a first control signal in accordance with any thickness error of such strip, signal integrating means providing an output signal to energize said mechanism, strip thickness controlling mechanism operation sensing means for supplying a second control signal in accordance with the operation of said mechanism, time control means responsive to the operational speed of the rolling mill for applying for a predetermined time period the first control signal to said signal integrating means when the first control signal has reached a predetermined minimum value and for subsequently applying second control signal to the signal integrating means until said output signal reaches a zero value, and output signal sensing means operative with the time control means upon said output signal reaching substantially a zero value to determine the start of another said time period.

6. In strip thickness control apparatus operative with a rolling mill having a strip thickness controlling motor, strip thickness sensing means operative with a strip passing through said rolling mill for providing an error control signal in accordance with the thickness error of such strip, signal providing means responsive to said error control signal for providing an output signal to energize said motor in accordance with a predetermined relationship to said error control signal, motor operation sensing means for supplying a feedback signal in accordance with the operation speed of said motor, and time control means responisve to the operational speed of said rolling mill for supplying for a predetermined time period the error control signal having a first polarity to said signal providing means and for subsequently applying the feedback signal having a second polarity to the signal providing means, and signal sensing means responsive to said output signal and operative with the time control means when said output signal reaches a zero value to determine the start of at least the first time period.

References Cited

UNITED STATES PATENTS 3,089,363  5/1963  Wallace et al. _____ 72—8

FRANCIS S. HUSAR, *Primary Examiner.*